US012019244B2

(12) United States Patent
de Matos Pereira Vieira et al.

(10) Patent No.: US 12,019,244 B2
(45) Date of Patent: Jun. 25, 2024

(54) HEAD-MOUNTED DISPLAY DEVICE

(71) Applicant: Lusospace, Projectos Engenharia Lda, Lisbon (PT)

(72) Inventors: Ivo Yves de Matos Pereira Vieira, Lisbon (PT); Joao Carlos de Sousa Gouveia Pereira Ricarte, Lisbon (PT)

(73) Assignee: LUSOSPACE, PROJECTOS ENGENHARIA LDA, Lisbon (PT)

( * ) Notice: Subject to any disclaimer, the term of this patent is extended or adjusted under 35 U.S.C. 154(b) by 0 days.

(21) Appl. No.: 18/016,054

(22) PCT Filed: Jul. 16, 2020

(86) PCT No.: PCT/EP2020/070145
§ 371 (c)(1),
(2) Date: Jan. 13, 2023

(87) PCT Pub. No.: WO2022/012750
PCT Pub. Date: Jan. 20, 2022

(65) Prior Publication Data
US 2023/0258939 A1   Aug. 17, 2023

(51) Int. Cl.
*G02B 27/01* (2006.01)
*G09G 3/32* (2016.01)

(52) U.S. Cl.
CPC .......... *G02B 27/0172* (2013.01); *G09G 3/32* (2013.01); *G09G 2300/0439* (2013.01)

(58) Field of Classification Search
CPC ............ G02B 27/0172; G02B 27/017; G02B 2027/0174; G02B 2027/0178; G09G 3/32; G09G 2300/0439
See application file for complete search history.

(56) References Cited

U.S. PATENT DOCUMENTS

| 2015/0085259 | A1  | 3/2015  | Schreiber et al. |
| 2015/0293358 | A1* | 10/2015 | de Matos Pereira Vieira ............ G02B 5/201 359/13 |
| 2019/0265476 | A1* | 8/2019  | Blum .................. G02B 27/0176 |
| 2021/0134242 | A1* | 5/2021  | Hei ........................... G09G 5/02 |
| 2021/0168282 | A1* | 6/2021  | Geng .................... G06F 1/1686 |

FOREIGN PATENT DOCUMENTS

| CN | 111078170 A    | 4/2020 |
| WO | 2014063716 A1  | 5/2014 |
| WO | 2016118640 A1  | 7/2016 |

* cited by examiner

*Primary Examiner* — Md Saiful A Siddiqui
(74) *Attorney, Agent, or Firm* — Hayes Soloway PC

(57) ABSTRACT

A head-mounted display device comprises a see-through element equipped with a plurality of pixel elements configured to emit light for displaying an image. In certain embodiments, the plurality of pixel elements are distributed across a display area of the see-through element in a manner to form a plurality of clusters, each of the plurality of clusters including a plurality of display segments and each of the plurality of display segments including a sub-plurality of the plurality of pixel elements. A cluster distance (Cx, Cy) between adjacent clusters is larger than a segment distance (Sx, Sy) between adjacent display segments in each of the adjacent clusters. The segment distance is larger than a pixel distance between adjacent pixel elements in each of the adjacent display segments.

14 Claims, 5 Drawing Sheets

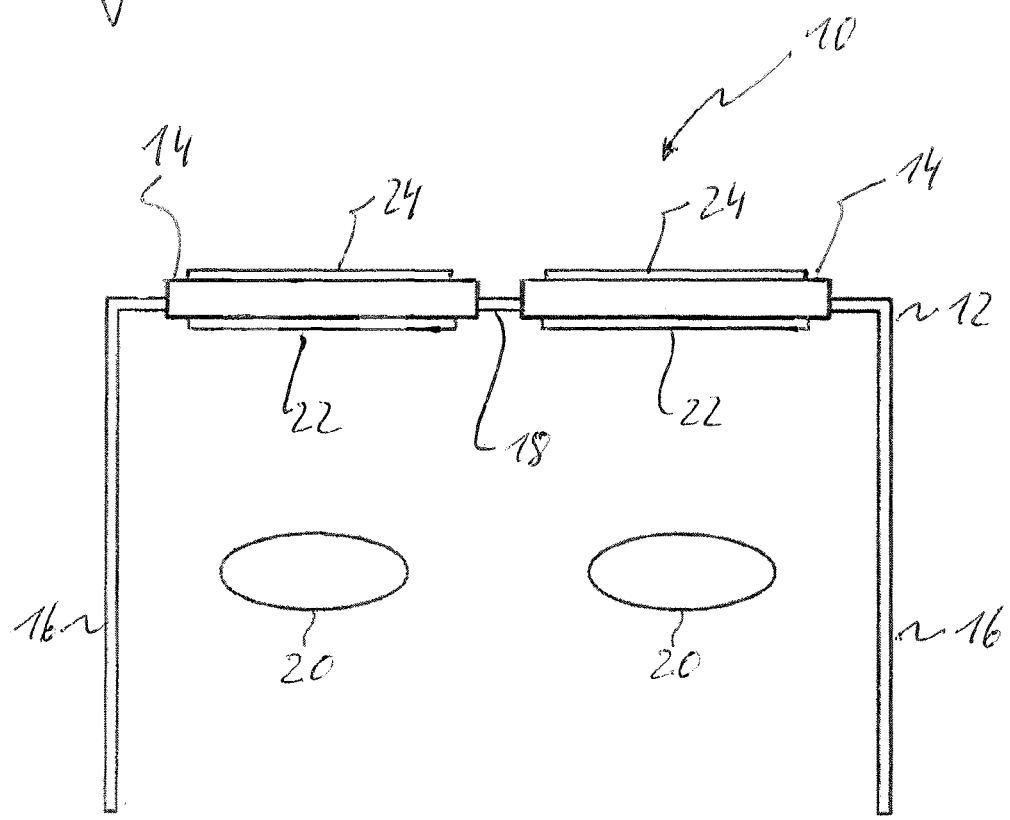

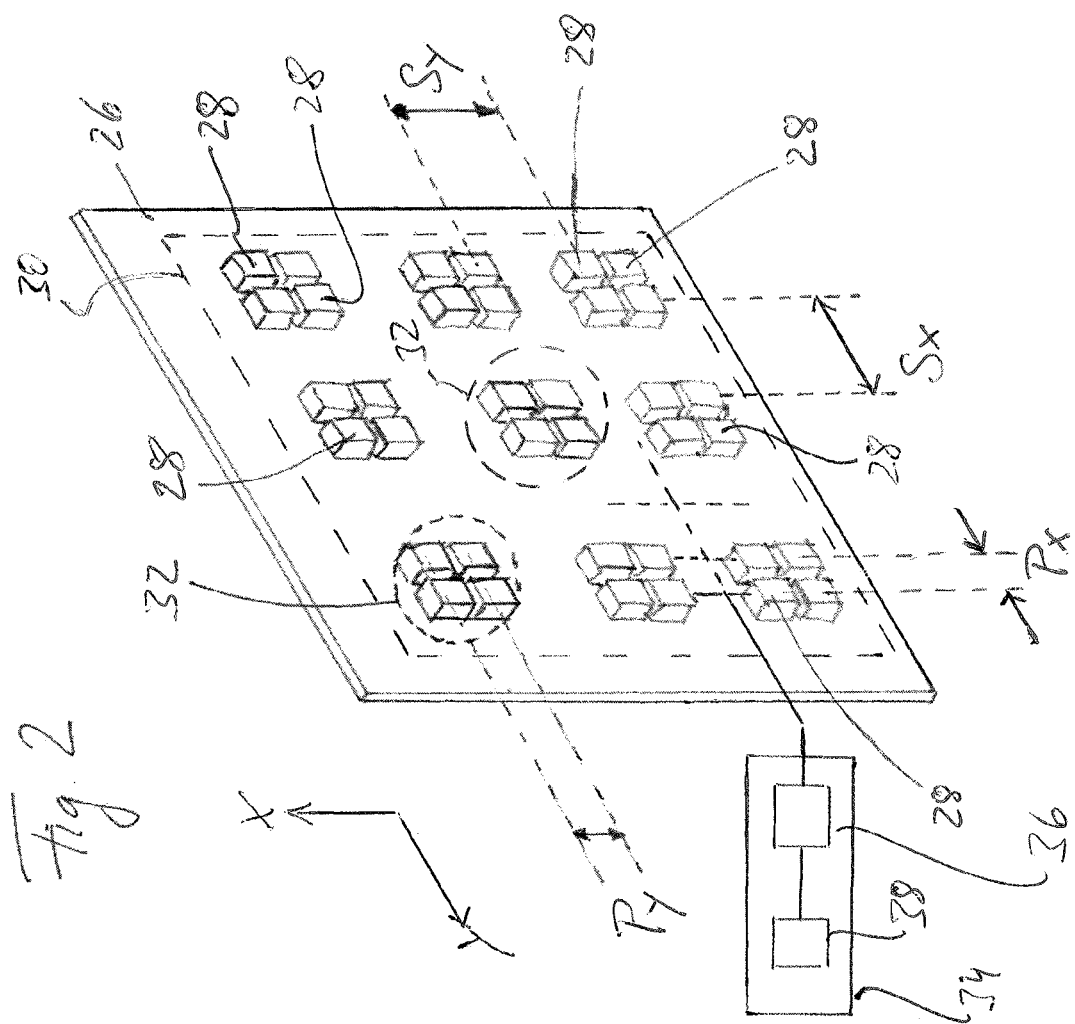

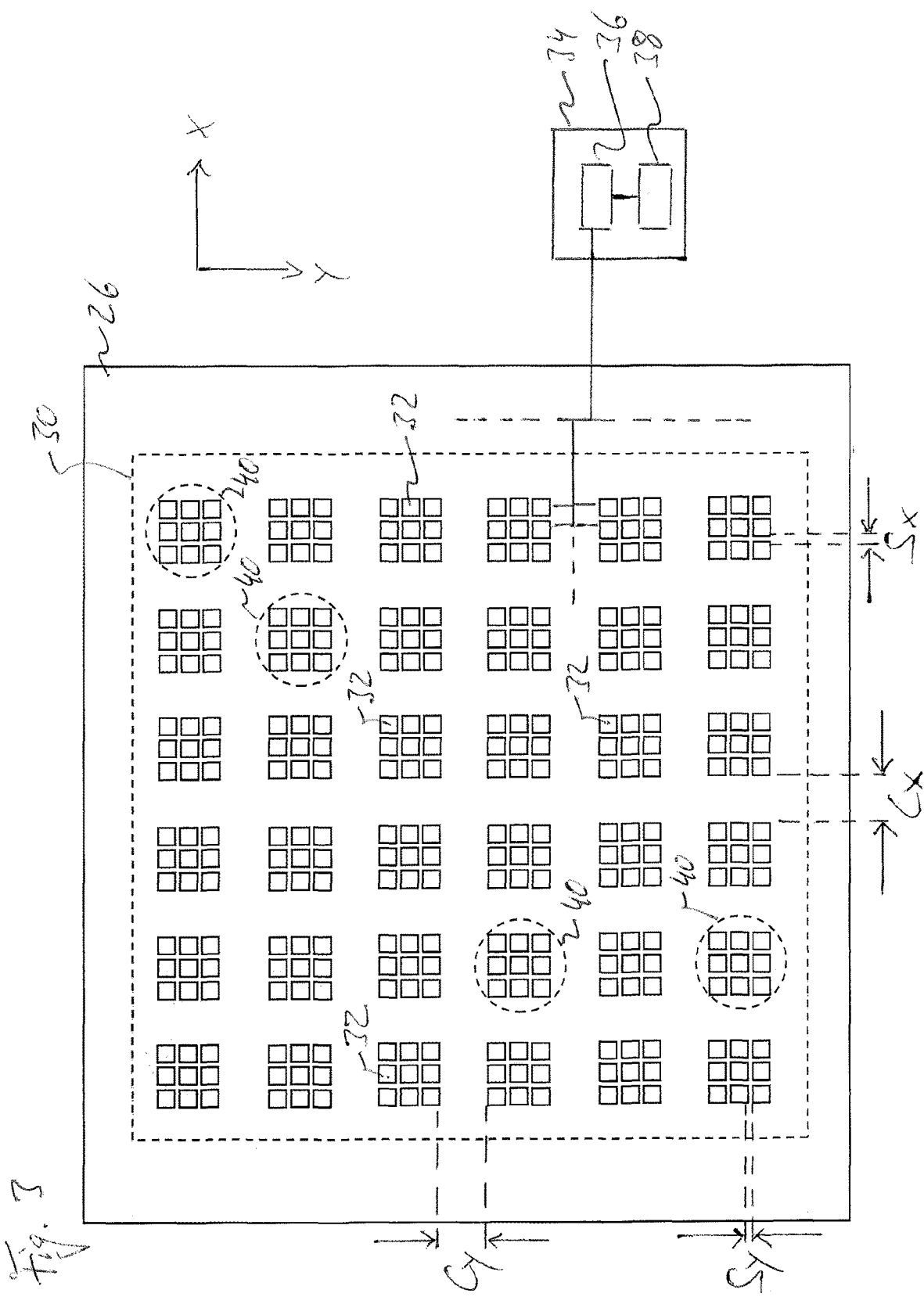

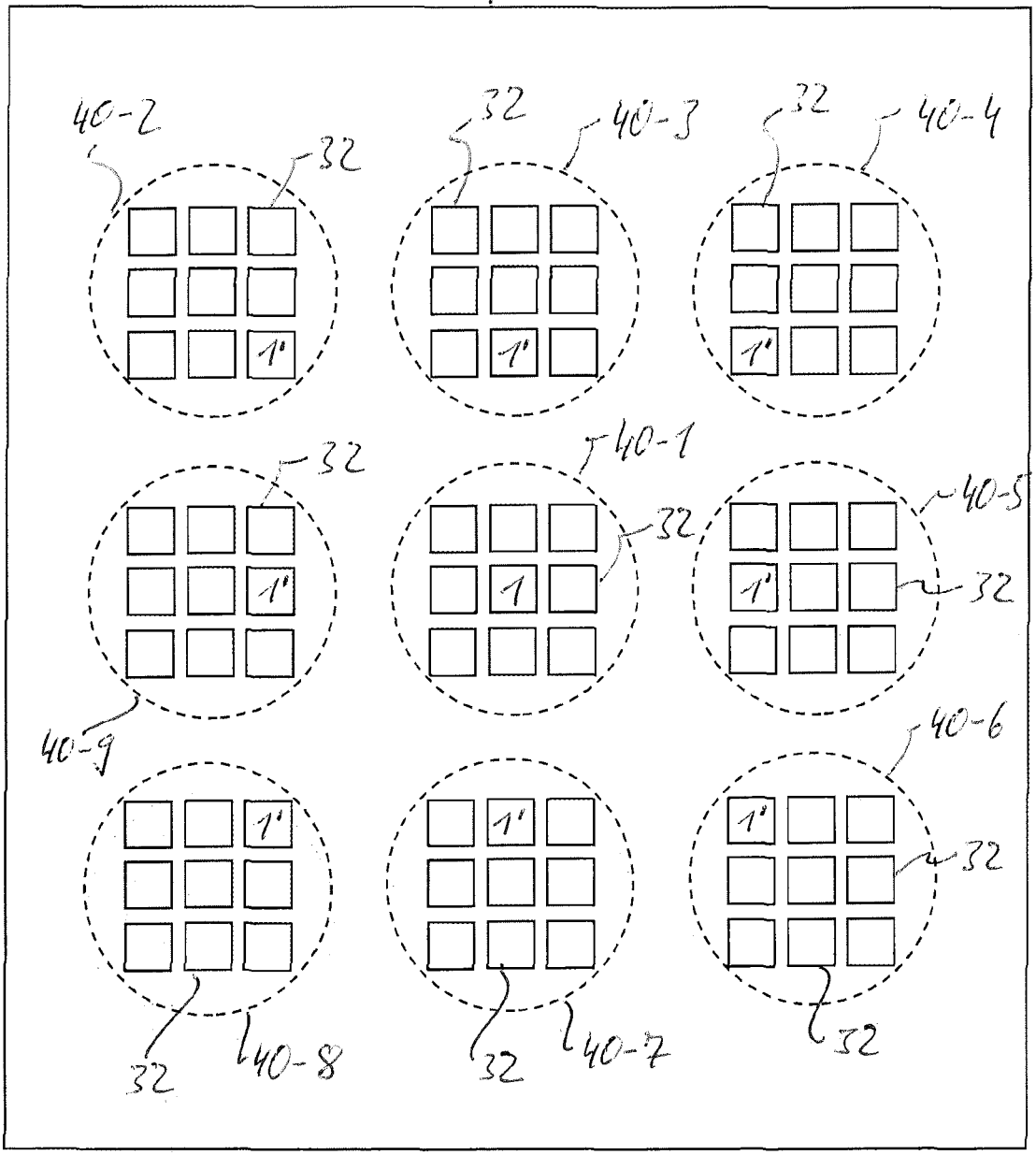

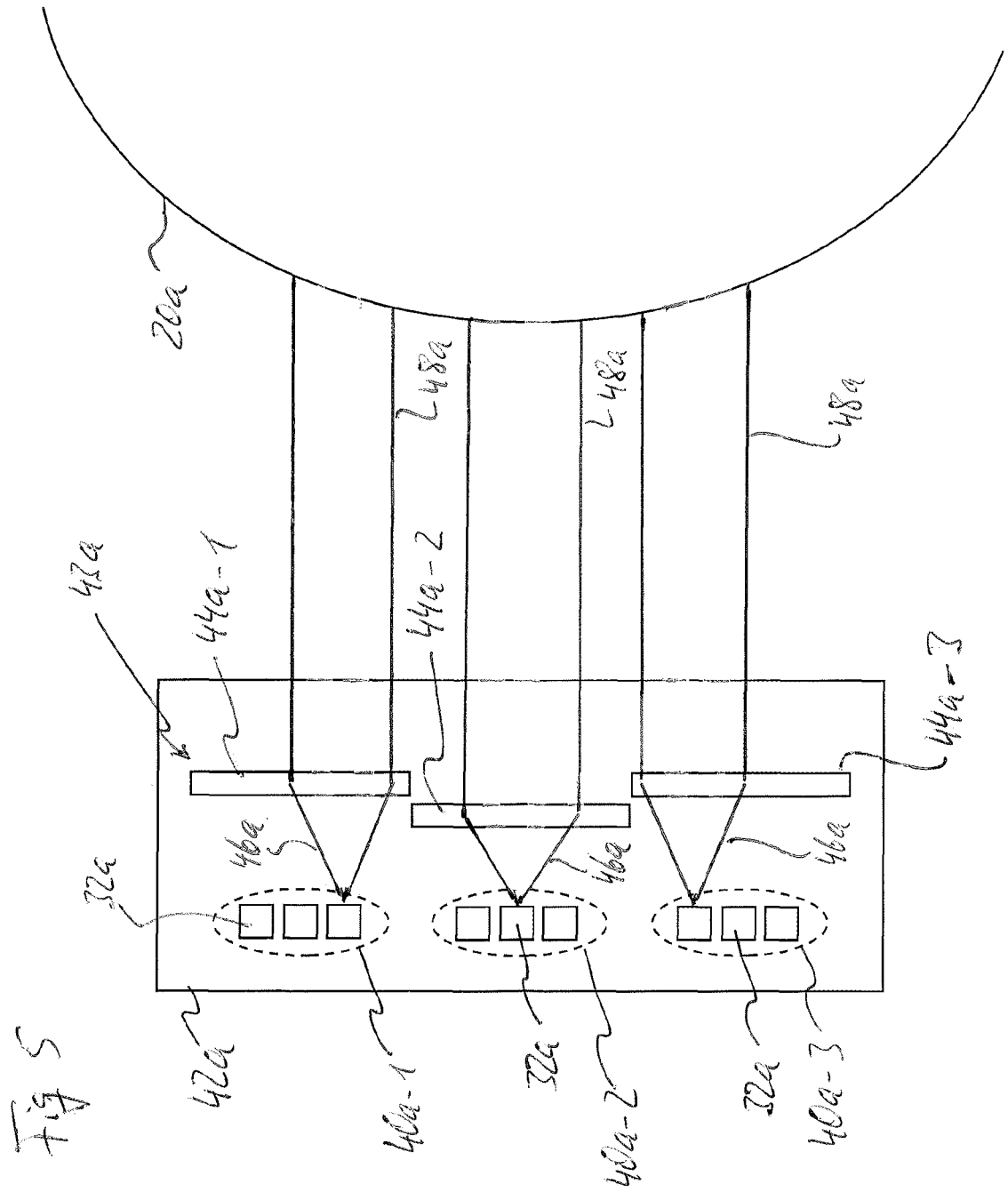

HEAD-MOUNTED DISPLAY DEVICE

CROSS-REFERENCE TO RELATED APPLICATIONS AND PRIORITY

This patent application claims priority from PCT Patent Application No. PCT/EP2020/070145 filed Jul. 16, 2020, which is herein incorporated by reference in its entirety.

The present invention relates to a head-mounted display (HMD) device.

HMD devices may be useful for augmented reality applications. In conventional HMD devices (see, e.g., WO 2014/063716 A1), a transparent sheet member is provided with an array of pixel elements, which can be driven to display pictorial representations, e.g., in the form of digits, symbols, icons, characters, graphics, text or other image presentations. The pictorial representation, hereinafter also referred to as briefly "image", is transmitted in the conventional art to the eye of the wearer of the HMD device using a system of optical structures having a lens effect and/or a mirror effect. The optical structures are formed together with the pixel elements on the transparent sheet member and have a collimating effect for light beams emerging from the pixel elements. The image displayed by the pixel elements may represent, e.g., informative information or may represent artwork without informative content. The pixel elements are distributed across the transparent sheet member in a sheet area located within the field of view of the eye or eyes of the wearer of the HMD device and leave sufficient space in order for a live view of the physical world to be seen by the wearer through the transparent sheet member, in addition to the image displayed by the pixel elements.

One of the challenges associated with HMD devices is to ensure that a user of the HMD device is able to see a sharp (i.e. focused) augmented reality image in spite of inevitable rotational eye movement. It is therefore an object of embodiments of the invention disclosed herein to provide an HMD device which permits a user to view a sharp augmented reality image at different rotational positions of his or her eyes.

The above and/or other objects of the present invention are achieved by an HMD device as defined in the accompanying claims and as shown and described herein.

In accordance with certain embodiments of the present invention, there is provided a head-mounted display device which comprises a see-through element provided with a plurality of pixel elements configured to emit light for displaying an image. The plurality of pixel elements are distributed across a display area of the see-through element in a manner to form a plurality of display segments. Each of the plurality of display segments includes a sub-plurality of the plurality of pixel elements, wherein a pixel distance between adjacent pixel elements belonging to adjacent display segments is larger than a pixel distance between adjacent pixel elements in each of the adjacent display segments. The display device further comprises control circuitry for electrically driving each of the plurality of pixel elements based on a mapping of pixels of an original image to the plurality of pixel elements. The control circuitry is adapted to map a plurality of different image portions of the original image to respective different ones of the plurality of display segments, wherein the control circuitry is adapted to map each of the plurality of different image portions to a respective different segment set. Each segment set includes a first display segment and at least one second display segment. In certain embodiments, between the first display segment and each of the at least one second display segment of each segment set there is arranged at least one display segment from at least one other segment set.

At least some or all of the plurality of image portions of the original image may each comprise a single pixel of the original image; additionally or alternatively, at least some or all of the plurality of image portions of the original image may each comprise multiple pixels of the original image. In certain embodiments, at least some or all of the plurality of image portions each contain as many pixels of the original image as the number of pixel elements included in a display segment.

The segment set includes in certain embodiments a plurality of second display segments located in different directions from the first display segment. The plurality of second display segments may be distributed with uniform angular spacing around the first display segment. There may be altogether four, eight or sixteen second display segments in the segment set.

The display segments may, or may not, be arranged in a clustered manner. Embodiments of the present invention having a clustered arrangement of display segments may provide a head-mounted display device which comprises a see-through element provided with a plurality of pixel elements configured to emit light for displaying an image, wherein the plurality of pixel elements are distributed across a display area of the see-through element in a manner to form a plurality of display segments. Each of the plurality of display segments includes a sub-plurality of the plurality of pixel elements, wherein a pixel distance between adjacent pixel elements belonging to adjacent display segments is larger than a pixel distance between adjacent pixel elements in each of the adjacent display segments. The plurality of display segments are distributed across the display area of the see-through element in a manner to form a plurality of clusters, each of the plurality of clusters including a sub-plurality of the plurality of display segments. A pixel distance between adjacent pixel elements belonging to adjacent clusters is larger than a pixel distance between adjacent pixel elements belonging to adjacent display segments in each of the adjacent clusters. These distance relationships apply in at least one dimension of the display area. In certain embodiments, the clusters are distributed in two dimensions across the display area, e.g., in accordance with a quadratic or parallelogram grid pattern. In such embodiments, the above distance relationships may apply separately in each of the two dimensions. In embodiments having a two-dimensionally distributed arrangement of the clusters, the cluster distance may be the same in each of the two dimensions.

Each of the segment sets mentioned above may be included in a respective different set of clusters, with each cluster set including two or more clusters. In some embodiments, the clusters of at least one cluster set include at least one pair of neighbouring clusters. In certain embodiments, the clusters of at least one cluster set are all non-neighbouring. The display segments of each segment set may be arranged at respective different segment positions in each of the clusters of at least one cluster set.

In accordance with certain embodiments of the present invention, there is furthermore provided a head-mounted display device which comprises a see-through element provided with a plurality of pixel elements configured to emit light for displaying an image, wherein the plurality of pixel elements are distributed across a display area of the see-through element in a manner to form a plurality of display segments. Each of the plurality of display segments includes a sub-plurality of the plurality of pixel elements, wherein a pixel distance between adjacent pixel elements belonging to adjacent display segments is larger than a pixel distance between adjacent pixel elements in each of the adjacent display segments. The display device further comprises an optical system for reducing the divergence of a divergent light beam emitted by each of the plurality of display segments, the optical system including a plurality of optical elements each associated with a respective different segment group. Each segment group includes a sub-plurality of the plurality of display segments. A light beam emitted by each display segment of a segment group is directed by the associated optical element at a position enabling reception of the light beam at a retina of an eye of a user wearing the head-mounted display device. The display device also comprises control circuitry adapted to drive each display segment of a segment set to display a same image portion (multi-pixel portion or single-pixel portion) of an original image. The segment set includes two or more display segments from the plurality of display segments, wherein each display segment of a segment set is included in a different segment group.

The optical elements may include at least one of holographic and diffractive optical elements. The holographic optical elements may implement transmissive optical structures and/or reflective optical structures. Diffractive optical elements may include at least one of micro-lens structures, pinhole structures, and micro-reflective mirrors (e.g., parabolic mirrors).

In embodiments having a clustered arrangement of the display segments, each of the plurality of clusters may correspond to a respective different segment group. It is to be understood, however, that the grouping of display segments to establish an association of each of the plurality of optical elements to a respective different segment group is not dependent on a physical clustering of the display segments and may be likewise implemented in embodiments exhibiting a uniform distribution of the display segments across the entire display area.

The see-through element comprises in certain embodiments a transparent base member (or main body) in the form of a plate, sheet, slice or lens. The display area is a continuous, uninterrupted area of the see-through element. The HMD device of the present invention may include more than one see-through element. Where the HMD device includes two or more see-through elements with physically distinct transparent base members, any number of the two or more see-through elements may be provided with a respective plurality of pixel elements in accordance with the present invention. As used herein, the term transparent is meant to not only refer to clear-view transparency but also encompass semi-transparency and opaqueness up to a level which still allows a user to view and recognize the real world through the see-through element. Rather than defining a particular level of transparency on the scale between full clarity and full opaqueness, the term transparent thus refers in the context of the present disclosure to a property of the see-through element allowing light in the visible wavelength range to pass through the see-through element to enable a wearer of the HMD device to watch the real world through the see-through element.

The plurality of pixel elements and the plurality of display segments may be distributed in two dimensions in the display area. Additionally, the plurality of clusters and/or the plurality of segments groups may be distributed in two dimensions in the display area. Certain embodiments of the present invention provide for at least one of the following:
the plurality of clusters are evenly distributed in each of the two dimensions;
the plurality of display segments included in each of the plurality of clusters are evenly distributed in each of the two dimensions; and
the sub-plurality of pixel elements included in each of the plurality of display segments are evenly distributed in each of the two dimensions.

The distribution patterns of the clusters, segments and pixel elements may be the same or different. Possible two-dimensional distribution patterns of at least one of the clusters, segments per cluster and pixel elements per segment include a quadratic, rectangular, hexagonal, parallelogram or triangular grid pattern.

In certain embodiments, the plurality of pixel elements are distributed along a first direction and a second direction which is perpendicular to the first direction. Each of the display segments may include a square array of pixel elements, e.g., a 2×2 or 3×3 array of pixel elements, and each of the clusters may include a square array of segments, e.g., a 3×3 array of segments. A pixel distance in the first and/or second directions between neighbouring pixel elements belonging to the same display segment may be equal or different throughout the plurality of display segments, and a segment distance in the first and/or second directions between neighbouring display segments belonging to the same display segment cluster may be equal or different throughout the plurality of clusters. The sub-plurality of pixel elements of each display segment are arranged in a mutually spaced manner with a given pixel distance in each of the first and second directions. The plurality of clusters are arranged in a mutually spaced manner with a given cluster distance in each of the first and second directions. And the plurality of display segments of each cluster are arranged in a mutually spaced manner with a given segment distance in each of the first and second directions. The segment distance is smaller than the cluster distance in at least one of the first and second directions, and the pixel distance is smaller than the segment distance in the at least one of the first and second directions.

In certain embodiments, each of the plurality of pixel elements is designed to emit wavelength-invariable light or is designed to emit wavelength-controllable light. Each of the pixel elements may be adapted to emit visible light (i.e. visible for a human eye). Variation of the emitted wavelength(s) of the pixel elements may be effected through electric control.

In certain embodiments, the display device comprises an optical system configured to receive light emitted from the plurality of pixel elements and shape the light emitted from the pixel elements of each segment set into a plurality of collimated, substantially parallel, spatially relatively offset light beams, each carrying light originating from a respective different of the display segments of the segment set. Replicated image information originating from the same portion of an original image can thus be delivered to a user's eye in a mutually displaced manner.

The head-mounted display device of the present invention can be any display device designed to be worn on a person's head and may, e.g., be part of a helmet or may have its own support structure for supporting the HMD device on a user's head. Such support structure may take, e.g., the form of a sturdy frame resting on a user's ears and/or nose or may include an elastic strap for sliding over the head or a textile band for tying around the head. In certain embodiments, the head-mounted display device is, or is part of, a pair of glasses or a visor. The head-mounted display device of the present disclosure may be so designed as to provide a plurality of display segment clusters in front of only a single eye of a wearer (i.e. person wearing the head-mounted display device) or provide respective pluralities of display segment clusters in front of each of a right eye and a left eye of the wearer.

The see-through element is a part or portion of the display device exhibiting transparency for visible light, so that the physical world around the user can be seen by the user through the see-through element. An area of the see-through element exhibiting the transparency may be referred to as a see-through area. The pixel elements may be disposed on at least one outer face of a transparent main body of the see-through element. The main body may be, e.g., in the form of a sheet, plate or lens. The pixel elements may be provided on the at least one outer face of the main body by attaching a transparent film or sheet having the pixel elements to the main body using gluing or other connection techniques, for example.

A pixel element is an element to display a monochromatic or polychromatic pixel of an image. In a monochromatic case, each pixel element may include a single light-emitting diode. In a polychromatic case, each pixel element may include a plurality of individually controllable light-emitting diodes of different colours (e.g., red, green and blue). The pixel elements may include, e.g., organic light-emitting diodes (OLEDs) or micro-LEDs or LCD elements.

In any direction of pixel element distribution, neighbouring pixel elements may have any of three distances from each other: a relatively short intra-segment pixel distance; a relatively longer intra-cluster, inter-segment pixel distance (or simply inter-segment pixel distance in non-clustered embodiments); and a yet relatively longer inter-cluster pixel distance (only for clustered embodiments, i.e. embodiments having a clustered arrangement of the display segments). The intra-segment pixel distance is a distance between adjacent (i.e. neighbouring) pixel elements belonging to the same display segment; the intra-segment pixel distance may also be simply referred to as a pixel distance. The intra-cluster, inter segment pixel distance is a distance between adjacent pixel elements belonging to adjacent display segments within the same cluster (or simply between adjacent pixel elements belonging to adjacent display segments in non-clustered embodiments); this distance may be simply referred to as a segment distance. The inter-cluster pixel distance is a distance between adjacent pixel elements belonging to adjacent clusters (only for clustered embodiments); this distance may be simply referred to as a cluster distance. In some embodiments, the inter-cluster pixel distance may be taken as a representative measure for the distance between adjacent clusters (i.e. cluster distance), and the intra-cluster, inter segment pixel distance may be taken as a representative measure for the distance between adjacent display segments belonging to the same display segment cluster (i.e. segment distance).

Thus, certain embodiments of the present disclosure provide a display device in which pixel elements located in the same display segment are mutually spaced with a relatively smaller pixel distance, while display segments located in the same display segment cluster are mutually spaced with a relatively larger segment distance and pairs of adjacent display segment clusters are spaced with a yet relatively larger cluster distance.

In a conventional HMD device, the pixels of an original image are mapped one-to-one to a respective pixel element of the HMD device. In certain embodiments of the present invention, conversely, a one-to-many mapping of pixels of the original image to the plurality of pixel elements is established. In such embodiments, one pixel of the original image is mapped to a group of pixel elements so that the group of pixel elements each display the same one pixel. This allows for the implementation of beam replication techniques capable of delivering a sharp image to a user's eye even in the presence of rotational eye movement relative to the HMD device. Using such beam replication techniques, a large eyebox can be obtained for the HMD device of the present invention. The group of pixel elements are each located in a different display segment, and the display segments including the group of pixel elements may each be located in a different cluster or in a different segment group (whereby each segment group is associated with a different optical element of the optical system). In certain embodiments, image content corresponding to the size of one display segment is replicated throughout the display area multiple times, i.e. multiple mutually distant display segments (which may each be located in a different cluster) are controlled and driven to display a same portion of an original image at the same time.

The pixel elements of each display segment may be distributed regularly or irregularly within the area of the respective display segment. Similarly, the display segments of each cluster may be distributed regularly or irregularly within the area of the respective cluster, and the clusters may likewise be distributed regularly or irregularly within the display area of the see-through element.

Further details, advantages and aspects of the present invention will become apparent from the following detailed description of certain embodiments when taken in conjunction with the drawings. In the drawings:

FIG. 1 schematically shows spectacles implementing an HMD device according to an exemplary embodiment;

FIG. 2 schematically and in perspective shows a portion of a see-through element of an HMD device in accordance with an exemplary embodiment of the present invention;

FIG. 3 schematically and in plan view shows a larger portion of the see-through element of FIG. 2;

FIG. 4 schematically and in plan view shows a portion of the see-through element of FIGS. 2 and 3; and FIG. 5 is a schematic representation of an optical operation of an HMD device in accordance with an embodiment of the present invention.

Reference is made initially to FIG. 1. Spectacles are generally designated 10 and comprise a frame 12 and two lenses (or glasses) 14 held in place by the frame 12. The frame 12 includes in a manner conventionally known per se, side arms 16 and a bridge 18. When worn by a user, the spectacles 10 rest with their side arms 16 on the ears of the user and rest with their bridge 18 on the nose of the user. The lenses/glasses 14 may be optical lenses providing a vision correction effect useful to mitigate a vision defect (e.g., myopia, astigmatism, hyperopia, presbyopia) of the eyes of the wearer of the spectacles 10 or may alternatively be simple sheets, slices or plates made of a transparent base material and providing no vision correction effect. In more general terms, the lenses/glasses 14 each implement a see-through element within the meaning of the present disclosure. The eyes of the user are designated 20 in FIG. 1. It is to be understood that an HMD device in accordance with the present invention is not limited to implementation in a pair of glasses. Other forms of implementation are possible and can be easily envisaged by a person of ordinary skill in the art. For example, a visor of a helmet may be another implementation of an HMD device in accordance with the present invention. Any device comprising suitable head-mounted support structure to position a see-through element in front of one or both eyes of a wearer of the device may be used to implement the present invention. The head-mounted support structure may be formed of, or include, one or more sturdy or rigid structural components (such as, e.g., the frame 12) and/or one or more flexible components such as, e.g., an elastic strap, a textile ribbon, a wire member, etc.

The spectacles 10 are also referred to hereinafter generally as an HMD device.

At least one of the lenses/glasses 14 is provided with a pixel element layer 22 and an optical element layer 24. In the example embodiment shown in FIG. 1, both lenses/glasses 14 are each provided with a pixel element layer 22 and an optical element layer 24. The pixel element layer 22 contains a plurality of pixel elements and the optical element layer 24 contains a plurality of optical elements. Neither the pixel elements nor the optical elements are specifically shown in FIG. 1; these elements will be described in more detail with reference to FIGS. 2 to 5. The pixel elements are distributed across the area of the associated lens/glass 14 in an altogether irregular manner to form a plurality of display segment clusters (hereinafter briefly "clusters") each containing a plurality of display segments (hereinafter briefly "segments"). Each segment, in turn, contains a plurality of pixel elements. Each pixel element of the pixel element layer 22 serves to display a respective pixel of an original image to be displayed by the HMD device 10.

The optical elements of the optical element layer 24 may include any elements effective to shape and/or direct light beams emitted by the pixel elements of the pixel element layer 22. The optical elements may include any of diffractive, refractive, transmissive and reflective structures. In certain embodiments, the optical elements are formed by holographic optical elements implementing mirrors which are reflective for light beams emitted by the pixel elements. In other embodiments, the optical elements are formed by holographic optical elements implementing convergent lens structures which are transmissive for light beams emitted by the pixel elements. In some embodiments, the pixel element layer 22 and the optical element layer 24 are provided on the same face of the associated lens/glass 14; in other embodiments, the layers 22, 24 are provided on opposite faces of the associated lens/glass 14. In the exemplary case shown in FIG. 1, the pixel element layer 22 is arranged on the side of its associated lens/glass 14 facing the left or right eye 20 and the optical element layer 22 is arranged on the opposite side of the lens/glass 14 which faces away from the left or right eye 20. In this case, the pixel elements of the pixel element layer 22 emit their light beams in a direction away from the left/right eye 20, and the optical elements of the optical element layer 24 are effective to reflect the received light beams and direct them towards the left/right eye 20. The pixel element layer 22 and the optical element layer 24 may be formed by separately manufactured films or sheets, which may be fixated to the lens/glass 14 through the use of a suitable adhesive, for example.

The HMD device 10 is so designed as to direct light beams emitted by the pixel elements of the pixel element layer 22 at the left or right eye 20, so that the light beams entering the left/right eye 20 are focused on the retina by the human cornea and human lens. In certain embodiments, the optical element layer 24 has a collimating effect for light beams emitted by the pixel elements of the pixel element layer 22. When emitted by the pixel elements, these light beams would typically be divergent, and the optical element layer 24 reduces the amount of divergence of the light beams to transform them into collimated light beams having substantially zero divergence (and zero convergence) or having a remaining slight amount of divergence.

The material of the lenses/glasses 14 is generally transmissive for light in the visible wavelength spectrum (i.e. visible for a human eye). At the same time, the pixel element layer 22 leaves sufficient interspace between adjacent pixel elements to allow the wearer of the HMD device 10 to observe an image of the physical world around him or her through the pixel element layer 22. These interspaces are left between adjacent pixel elements belonging to different segments or different clusters and may also be left between adjacent pixel elements belonging to the same segment. In this way, the user of the HMD device 10 can see the physical world around him or her and simultaneously see an augmented reality image created by the pixel element layer 22 in conjunction with the optical element layer 24.

Reference is now made additionally to FIG. 2, which schematically depicts a portion of a see-through element 26 provided with a plurality of pixel elements 28 distributed in an irregular manner within a display area 30 of the see-through element 26. The see-through element 26 is formed of, or includes, a base material which is transparent for light in the visible wave-length range and may be made of a glass or plastics material. The see-through element 26 may be formed by any of the lenses/glasses 14 of the HMD device 10 of FIG. 1. In such a case, the pixel elements 28 may be included in the pixel element layer 22. As can be seen from FIG. 2, the pixel elements 28 are grouped into segments 32 each containing in the illustrated exemplary embodiment a regular 2×2 arrangement of four pixel elements 28. It is to be understood that the number of pixel elements 28 in each segment 32 is not limited to four and that any other plural number of pixel elements 28 may instead be included in each segment 32. It is moreover to be understood that the pattern of arrangement of the pixel elements 28 in each segment 32 is not limited to a quadratic matrix arrangement (such as, e.g., in a 2×2, 5×5 or 20×20 matrix), but can be any pattern including, but not limited to, e.g., a rectangular matrix arrangement (e.g., 3×2, 5×3 or 10×5), a triangular matrix arrangement, a diamond-shape matrix arrangement, etc. Altogether, the total number of pixel elements 28 per segment 32 may be anywhere between 2 and above 100. It is furthermore to be understood that the number of pixel elements 28 may, or may not, be the same in all segments 32.

In the embodiment illustrated in FIG. 2, the segments 32 are regularly arranged in rows and columns with a distance Sx between adjacent segments 32 in a row direction ($1^{st}$ direction, or x-direction) and a distance Sy between adjacent segments 32 in a column direction ($2^{nd}$ direction, or y-direction). The distance Sx can be measured, e.g., from center to center of two pixel elements 28 which neighbour each other in the row direction and each belong to a different segment 32 from a pair of neighbouring segments 32. Alternatively, the distance Sx may be measured as the gap from edge to edge between the neighbouring pixel elements 28. The distance Sx represents an intra-cluster, inter-segment pixel distance in the row direction and applies to the x-distance between neighbouring segments 32 within the same cluster of segments 32. The distance Sy can be defined similarly and represents an intra-cluster, inter-segment pixel distance in the column direction. The distance Sx and the distance Sy may be equal or may be different. In certain embodiments, the distance Sx is the same for all pairs of segments 32 which neighbour each other in the row direction and belong to the same cluster. Similarly, the distance Sy is the same in certain embodiments for all pairs of segments 32 which neighbour each other in the column direction and belong to the same cluster. Furthermore, certain embodiments provide for the distance Sx to be the same throughout all clusters and/or the distance Sy to be the same throughout all clusters. The distance Sx may be briefly referred to as a segment distance in the row direction, and the distance Sy may be briefly referred to as a segment distance in the column direction.

As can be further seen from FIG. 2, the pixel elements 28 of each segment 32 are distributed along the same row and column directions as the segments 32 and have an intra-segment pixel distance Px from each other in the row direction and an intra-segment pixel distance Py from each other in the column direction. The distances Px and Py may be the same or may be different. Again, the distances Px and Py can be measured, e.g., from center to center of two adjacent pixel elements 28 belonging to the same segment 32 or may be measured as the edge-to-edge gap between the two adjacent pixel elements 28. In certain embodiments, the distance Px is the same for all pairs of pixel elements 28 which are adjacent to each other in the row direction and belong to the same segment 32 (applicable only if more than two pixel elements 28 are provided per segment 32 in the row direction). Similarly, the distance Py is the same in certain embodiments for all pairs of pixel elements 28 which are adjacent to each other in the column direction and belong to the same segments 32 (applicable only if more than two pixel elements 28 are provided per segment 32 in the column direction). Furthermore, certain embodiments provide for the distance Px to be the same throughout all segments 32 of a cluster and possibly also throughout all clusters and/or the distance Py to be the same throughout all segments 32 of a cluster and possibly also throughout all clusters. The distance Px may be briefly referred to as a pixel distance or pixel pitch in the row direction, and the distance Py may be briefly referred to as a pixel distance or pixel pitch in the column direction.

As can be readily appreciated from the illustration in FIG. 2, the segment distance Sx in the row direction is larger than the pixel distance Px, and the segment distance Sy in the column direction is larger than the pixel distance Py. For example, the segment distance Sx may be larger by a factor 2 or 3 or 5 or 10 or 20 or more than the pixel distance Px, and the segment distance Sy may be larger by a factor 2 or 3 or 5 or 10 or 20 or more than the pixel distance Py. The factor by which the segment distance Sx is larger than the pixel distance Px may be the same or different from the factor by which the segment distance Sy is larger than the pixel distance Py. The segments 32 and the pixel elements 28 in each segment 32 are thus arranged with different distances.

The pixel elements 28 may have any design suitable to emit light under electric control. In certain embodiments, the pixel elements 28 are formed from light emitting diodes (including organic light emitting diodes, OLEDs, and micro-LEDs). In other embodiments, other types of light-emitting structures may be used to implement the pixel elements 28, including micro-laser structures and liquid crystal display (LCD) elements.

The light emission spectrum of the pixel elements 28 may be monochromatic or polychromatic. In the case of a polychromatic spectrum, each pixel element 28 may be composed of a plurality (e.g., three) sub-pixel elements, wherein each sub-pixel element is adapted to emit light of a different monochromatic colour, for example red, blue and green. Through individual control of the sub-pixel elements using suitable electric drive circuitry, a multitude of colours from a polychromatic color range can be created. Each sub-pixel element may be configured as a light-emitting diode, an organic light-emitting diode, an LCD element or a micro-laser, for example.

FIG. 2 additionally depicts control circuitry 34 including an electric pixel drive circuit 36 and an electronic control unit 38 to individually control the pixel elements 28 included in the segments 32. The control provided by the control circuitry 34 includes an on-off control of the pixel elements 28 and in certain embodiments furthermore includes a control of at least one of the intensity and color of the light emitted by each pixel element 28. The on-off control determines whether each pixel element 28 is actively emitting light (i.e. on-state) or remains dark (off-state). The control unit 38 has stored therein, or has access to, pixel information of an original, pixelated image and is suitably configured (e.g., by programming) to map the pixel information of the original image to the pixel elements 28 of the see-through element 26. Based on the mapping, the control unit 38 controls the pixel drive circuit 36 to electrically drive the pixel elements 28.

Additional reference is now made to FIG. 3, which shows a larger portion of the see-through element 26 of FIG. 2. In FIG. 3, pixel elements 28 of the see-through element 26 are not depicted individually. Instead, FIG. 3 only illustrates the distribution of the segments 32 of the see-through element 26 across the display area 30. As can be seen, the segments 32 are grouped in clusters 40, which are regularly distributed in same x- and y-directions (row and column directions) as the segments 32 in FIG. 2, with a distance Cx existing between adjacent clusters 34 in the row direction and a distance Cy existing between adjacent clusters 34 in the column direction. In the example embodiment shown in FIG. 3, each cluster 40 is composed of a total of nine segments 32 arranged in a 3×3 matrix array. It is to be understood that the total number of segments 32 included in each cluster 40 is not limited to nine and may in other embodiments include any other plural number of segments 32. For the sake of explanation of the principles of the present invention, however, it is assumed hereinafter that each cluster 40 contains a total of nine segments 32. It is moreover to be understood that the pattern of arrangement of the segments 32 in each cluster 40 is not limited to a quadratic matrix arrangement (such as, e.g., in a 2×2, 3×3, 4×4 or 5×5 matrix), but can be any pattern including, but not limited to, e.g., a rectangular matrix arrangement (e.g., 3×2, 4×3 or 5×2), a triangular matrix arrangement, a diamond-shape matrix arrangement, etc. Altogether, the total number of segments 32 per cluster 40 may be anywhere between 2 and above 20.

The distance Cx can be measured, e.g., from center to center of two pixel elements 28 which neighbour each other in the row direction and each belong to a different cluster 40 from a pair of neighbouring clusters 40. Alternatively, the distance Cx may be measured as the edge-to-edge gap between the neighbouring pixel elements 28. The distance Cx represents an inter-cluster pixel distance in the row direction. The distance Cy can be defined similarly and represents an inter-cluster pixel distance in the column direction. The distances Cx and Cy may be equal or different. In certain embodiments, the distance Cx is the same for all pairs of clusters 40 which neighbour each other in the row direction. Similarly, the distance Cy is the same in certain embodiments for all pairs of clusters 40 which neighbour each other in the column direction. The distances Cx and Cy may be briefly referred to as a cluster distance in the row and column directions, respectively.

As can be readily appreciated from the illustration in FIG. 3, the cluster distance Cx in the row direction is larger than the segment distance Sx, and the cluster distance Cy in the column direction is larger than the segment distance Sy. For example, the cluster distance Cx may be larger by a factor 2 or 3 or 5 or 10 or more than the segment distance Sx, and the cluster distance Cy may be larger by a factor 2 or 3 or 5 or 10 or more than the segment distance Sy. The factor by which the cluster distance Cx is larger than the segment distance Sx may be the same or different from the factor by which the cluster distance Cy is larger than the segment distance Sy. The clusters 40 and the segments 32 are thus arranged with different distances; the clustering makes some pairs of neighbouring segments 32 (i.e. those pairs of which the neighbouring segments 32 are located in different clusters) have a larger spacing than other pairs of neighbouring segments 32 (i.e. those pairs of which the neighbouring segments 32 are located in the same cluster).

The size and density of the pixel elements 28, segments 32 and clusters 40 are suitably chosen to leave sufficient space between the pixel elements 28, segments 32 and clusters 40 for the user to recognize the physical world from light passing through the see-through element 26 in the spaces between the pixel elements 28, segments 32 and clusters 40.

In the embodiment of FIGS. 2 and 3, the clustering of the segments 32 may be utilized to so-to-say replicate a light beam emitted by a specific segment 32 located in a specific cluster 40 by controlling one or more other segments 32 located in one or more other clusters 40 to display at the same time the same portion of an original image which is currently displayed by the specific segment 32. In particular, certain embodiments provide for the control circuitry 34 to be suitably configured to control the pixel elements 28 so that an original image portion currently displayed by a specific segment 32 located in a specific cluster 40 is replicated (i.e. displayed at the same time) by a plurality of other segments 32 each located in a different neighbouring cluster 40. The control circuitry 34 is capable of performing the requisite mapping of a specific image portion of an original image to plural segments 32 located in different clusters 40. The replication of the display of original image portions using the clustered arrangement of the display segments 32 of FIGS. 2 and 3 will be explained in more detail hereinafter with reference to FIGS. 4 and 5.

FIG. 4 shows in plan view a portion of the see-through element 26 of FIGS. 2 and 3. Nine display segment clusters 40-1 to 40-9 are shown altogether in FIG. 4 in a 3-×3 arrangement. Each of the clusters 40-1 to 40-9 of FIG. 4 corresponds to one of the clusters 40 of FIG. 3 and comprises—as in FIG. 3—a total of nine display segments 32 arranged in a 3-×3 matrix. A center cluster is designated 40-1 in FIG. 4, and the clusters surrounding the center cluster 40-1 are designated 40-2 to 40-9. Each of the clusters 40-2 to 40-9 is thus a neighbour to the center cluster 40-1. In the example shown in FIG. 4, the surrounding clusters 40-2 to 409 are distributed around the center cluster 40-1 with a uniform angular spacing. Evidently, the term center cluster only refers to the central location of the cluster 40-1 in the cluster set shown in FIG. 4; the which center cluster 40-1 need not be located in the center of the see-through element 26 and can instead be located anywhere in the display area 30 of the see-through element 26.

The center cluster 40-1 has a center segment 32 (first segment) which is labelled with an inscribed numeral 1 in FIG. 4. The term center segment refers to a segment which is located in the center of the 3×3 matrix of segments of the cluster under consideration. The surrounding clusters 40-2 to 40-9 each have a peripheral segment 32 (second segments) labelled with an inscribed numeral 1'. The term peripheral segment refers to any of the segments which are not the center segment of the 3×3 matrix of segments of the cluster under consideration. The numeral 1 is indicative of a specific portion of an original image which is displayed by the center segment 32 of the center cluster 40-1 at a certain point of time. The numeral 1' is indicative of a replication or "copy" of that same original image portion. Each of the neighbouring, i.e. surrounding clusters 40-2 to 40-9 has a peripheral segment 32 which displays the "copy" 1' at the same point of time as the center segment 32 of the center cluster 40-1 displays the original image portion 1. The segment 32 displaying the original image portion 1 and the segments 32 displaying the "copies" 1' of the original image portion 1 together form a segment set, the members of which are each driven by the control circuitry 34 to display the same image content at the same time. The control unit 38 has a function of mapping the same original image portion to all members of the segment set.

As can be seen from FIG. 4, the peripheral segments 32 displaying the "copies" 1' of the original image portion 1 are located at respective different peripheral positions in the clusters 40-2 to 40-9. In the example embodiment of FIG. 4, the cluster 40-2, which is a top-left neighbour to the center cluster 40-1, displays the "copy" 1' at its bottom-right corner segment 32, which is closest to the center cluster 40-1. Similarly, the top-right, bottom-right and bottom-left neighbour clusters 40-4, 40-6 and 40-8 each display the "copy" 1' at their bottom-left, top-left and top-right corner segments 32, respectively. The top, right, bottom and left neighbour clusters 40-3, 40-5, 40-7 and 40-9 display the "copy" 1' at their bottom, left, top and right mid-edge segments 32, respectively.

In the embodiment illustrated in FIG. 4, the clusters 40-1 to 40-9 together form a cluster set in the sense of the present disclosure. Each cluster of the cluster set has a segment 32 which displays the same pixel set of the original image, i.e. the same original image portion. As noted above, each of the clusters 40-2 to 40-9 is a neighbour to the center cluster 40-1.

It is to be understood, however, that it is not necessary for the clusters 40-2 to 40-9 displaying the "copies" 1' to be neighbours of the center cluster 40-1. Instead, it is within the scope of the present disclosure for a cluster set to include no mutual neighbours. A cluster set may thus include no pair of clusters 40 which are neighbours to each other. For example, an embodiment can be envisaged in which a cluster set includes a center cluster 40 and a plurality of surrounding clusters 40 surround the center cluster 40, e.g., with uniform angular spacing. Between each of the surrounding clusters 40 and the center cluster 40, i.e. when viewed in a radial direction as seen from the center cluster 40, there may be located at least one other cluster 40 belonging to a different cluster set.

Using the above replication pattern, an original image portion displayed at the center segment 32 of a particular cluster 40 can be replicated in total eight times by respective different peripheral segments 32 (different in terms of location along the cluster periphery) of eight surrounding clusters 40. The segments 32 of each cluster 40 then each display a different portion of the original image, with the center segment 32 displaying so-to-say an "original" image portion and the remaining (i.e. peripheral) segments 32 each displaying a "replica". The replication pattern explained herein can be applied to all clusters 40 provided in the display area 30 of the see-through element 26, subject to the restriction that clusters 40 located at the periphery of the display area 30 are not surrounded on all sides by other clusters 40, but only have a reduced number of neighbouring clusters 40.

In the above-envisaged exemplary scenario, the eight "replicas" of the "original" image portion are manifest in eight "replicated" light beams which are shifted, or displaced, in the x-y-plane with respect to a light beam produced by the segment 32 displaying the "original" of the image portion under consideration (i.e. "original" light beam). In certain embodiments, the replicated light beams and the original light beam travel as collimated light beams in substantial parallelism with each other from the see-through element 26 to the eye(s) of the wearer of the HMD device. These light beams may be spatially disjoint or may be partially overlapping.

Further reference is now made to FIG. 5 where the same or similar components are designated using the same reference numerals as in FIGS. 1 to 4, with the distinction that a letter 'a' is appended to the reference numerals inserted in FIG. 5. Inasmuch as the following explanation of FIG. 5 does not teach otherwise, reference is made to the foregoing description of FIGS. 1 to 4 for an explanation of these components.

In FIG. 5, an HMD device in accordance with an embodiment of the present invention is generally designated 42a and as shown positioned for proper use in front of an eye 20a of a user wearing the HMD device 42a. The HMD device 42a comprises a plurality of pixel elements (not shown in FIG. 5) which are provided on a see-through element (not shown, but formed, e.g., by the see-through element 26 of FIGS. 2 to 4) and are grouped into a plurality of display segments 32a having a clustered arrangement. The grouping of the pixel elements into the segments 32a may follow the same principles as explained in conjunction with FIG. 2, and the clustering of the display segments 32a into clusters 40a may follow the same principles as explained in conjunction with FIGS. 3 and 4. Shown in FIG. 5 are three clusters 40a-1, 40a-2 and 40a-3 with three segments 32a in each cluster 40a-1, 40a-2, 40a-3. It is to be understood that the total number of segments 32a in each cluster 40a-1, 40a-2 or 40a-3 may be larger than three and may be, e.g., nine (as in FIGS. 3 and 4). The view of the HMD device 42a in FIG. 5 corresponds to a sectional view of the see-through element 26 of FIGS. 3 and 4, so that segments 32a located in planes forward and rearward of the drawing plane of FIG. 5 would not be seen in the sectional view of FIG. 5.

The HMD device 42a further comprises an optical system 43a including a plurality of holographic optical elements 44a, which together may form, or be included in, the optical element layer 24 of FIG. 1. In the example scenario shown in FIG. 5, the holographic optical elements 44a are disposed at a distance from the segments 32a on the side of the segments 32a facing the eye 20a and are transmissive for light beams 46a produced by the segments 32a. The pixel elements included in the segments 32a are oriented so as to emit light in the general direction of the eye 20a. In alternate embodiments, the pixel elements included in the segments 32a are oriented so as to emit light in a direction away from the eye 20a. In such embodiments, the HMD device 42a would include holographic optical elements disposed at a distance from the segments 32a on the side of the segments 32a facing away from the eye 20a and offering a reflective effect for the light beams 46a. The holographic optical elements 44a (whether transmissive or reflective for the light beams 46a) reduce the divergence of the light beams 46a, which are divergent when emitted from the segments 32a, to transform the light beams 46a into collimated light beams 48a and direct the collimated light beams 48a at the eye 20a. Plural collimated light beams 48a carrying image information from the same original image portion (i.e. an original light beam and one or more replicated light beams) propagate in parallel with each other from the location of the holographic optical elements 44a to the eye 20a, as shown in FIG. 5. Conversely, collimated light beams 48a carrying image information from different portions of the original image may propagate from the location of the holographic optical elements 44a to the eye 20a either in parallel or at an angle to each other.

In FIG. 5, each holographic optical element 44a is associated with a respective different of the clusters 40a. Thus, the cluster 40a-1 is associated with a holographic optical element 44a-1, the cluster 40a-2 is associated with a holographic optical element 44a-2, and the cluster 40a-3 is associated with a holographic optical element 44a-3. Only the light beams 46a originating from the segments 32a of a particular cluster 40a will be properly collimated and directed at the eye 20a by the associated holographic optical element 44a. Others of the holographic optical elements 44a which are not associated with the particular cluster 40a will not properly collimate and direct the light beams 46a emerging from the segments 32a of the particular cluster 40a at the eye 20a.

In the example situation shown in FIG. 5, three light beams 46a produced by a center segment 32a of the cluster 40a-2, a lower segment 32a of the cluster 40a-1 and an upper segment 32a of the cluster 40a-3 display the same portion of an original image. Using the terminology introduced above, the light beam 46a produced by the center segment 32a of the cluster 40a-2 may be referred to as an original light beam, whereas the light beams 46a produced by the lower segment 32a of the cluster 40a-1 and the upper segment 32a of the cluster 40a-3 may be referred to as replicated light beams. As can be seen, these light beams travel as mutually parallel collimated light beams 48a after collimation by the holographic optical elements 44a-1, 44a-2, 44a-3 to the eye 20a and hit the anterior surface of the eye 20a at respective different, relatively spatially offset positions or areas. Assuming for the sake of explanation that the HMD device 42a of FIG. 5 has the same 3×3 arrangement of segments 32a in each cluster 40a as shown in FIGS. 3 and 4, further six replicated light beams will be produced by the HMD device 42a as replicas of the original light beam emitted from the center segment 32a of the cluster 40a-2, three emitted by segments 32a in clusters 40a located forward of the drawing plane of FIG. 5 and three emitted by segments 32a in clusters 40a located rearward of the drawing plane of FIG. 5.

Summarizing up, the optical system 43a shapes the light received from the segments 32a into collimated light beams 48a. The optical system 43a is configured so that collimated light beams 48a originating from segments 32a which display at the same time the same original image portion have the same propagation direction from the optical system 43a to the eye 20a and are spatially offset relative to each other. Collimated light beams 48a originating from segments 32a which display different image portions of an original image and thus carry different image information, conversely, may propagate with mutually different directions from the optical system 43a to the eye 20a.

In the example embodiment shown in FIG. 5, the holographic optical elements 44a are shown with mutual overlap. I is to be understood that other embodiments in which the holographic optical elements 44a are formed without mutual overlap are readily conceivable.

An HMD device in accordance with the present invention may offer a larger exit pupil than conventional HMD devices providing no beam replication, i.e. no replication of an original light beam at a plurality of spatially offset positions across the area of an array of pixel elements of the HMD device. The exit pupil may become larger as a result of the creation of the plurality of spatially offset light beams. Embodiments of the present invention may thus ensure that image information of an original image can reach and enter a user's pupil also in the presence of movements of the user's eye relative to the HMD device.

According to embodiments of the present invention, clusters of display segments may be evenly distributed across a display area of a see-through element of an HMD device, wherein each cluster may include an even distribution of display segments and each display segment may include an even distribution of pixel elements. In other embodiments having no clustered arrangement of display segments, the display segments may be evenly distributed across the display area of the see-through element. Plural subsets of pixel elements of an HMD device may be controlled so that each of the plural subsets displays the same (multi-pixel or single-pixel) image portion of an original image. Certain embodiments of the present invention provide for a one-to-many mapping of (multi-pixel or single-pixel) image portions of the original image to respective different sets of display segments, so that each segment of a segment set displays the same original image portion and different original image portions are displayed by different segments sets. The segments of each segment set may be mutually non-adjacent, i.e. one or more segments from at least one other segment set may be located between each pair of segments of a particular segment set. An HMD device offering a large-size eyebox can be provided by replicating image content on a set of mutually non-adjacent display segments. Control circuitry of the HMD device may be suitably configured to map the same image portion to each of the subsets of pixel elements and drive the pixel elements of the subsets in accordance with the mapping. In this way, a plurality of light beams representing the same image information from the same original image portion can be produced and delivered to a user's eye in a spatially distributed manner. Even in the presence of movements of his or her eyes, the user can always view a sharp image of the information displayed by the HMD device.

The invention claimed is:

1. A head-mounted display device, comprising:
 a see-through element provided with a plurality of pixel elements configured to emit light for displaying an image, wherein the plurality of pixel elements are distributed across a display area of the see-through element in a manner to form a plurality of display segments, each of the plurality of display segments including a sub-plurality of the plurality of pixel elements,
 wherein a pixel distance between adjacent pixel elements belonging to adjacent display segments is larger than a pixel distance between adjacent pixel elements in each of the adjacent display segments,
 control circuitry for electrically driving each of the plurality of pixel elements based on a mapping of pixels of an original image to the plurality of pixel elements, the control circuitry being adapted to map a plurality of different image portions of the original image to the plurality of display segments,
 wherein the control circuitry is adapted to map each of the plurality of different image portions to a respective different segment set, each segment set including a first display segment and at least one second display segment.

2. The display device of claim 1, wherein between the first display segment and each of the at least one second display segment of the segment set there is arranged at least one display segment from at least one other segment set.

3. The display device of claim 1, wherein the segment set includes a plurality of second display segments located in different directions from the first display segment.

4. The display device of claim 3, wherein the plurality of second display segments are distributed with uniform angular spacing around the first display segment.

5. The display device of claim 3, wherein the plurality of second display segments is four, eight or sixteen second display segments.

6. The display device of claim 1, wherein each segment set is included in a respective different set of clusters, each cluster set including two or more clusters.

7. The display device of claim 6, wherein the clusters of at least one cluster set include at least one pair of neighbouring clusters.

8. The display device of claim 6, wherein the clusters of at least one cluster set are all non-neighbouring.

9. The display device of claim 6, wherein the display segments of each segment set are arranged at respective different segment positions in each of the clusters of at least one cluster set.

10. The display device of claim 1, wherein the plurality of pixel elements and the plurality of display segments are distributed in two dimensions in the display area.

11. The display device of claim 10, wherein the plurality of display segments are distributed across the display area of the see-through element in a manner to form a plurality of clusters, each of the plurality of clusters including a sub-plurality of the plurality of display segments,
 wherein a pixel distance between adjacent pixel elements belonging to adjacent clusters is larger than a pixel distance between adjacent pixel elements belonging to adjacent display segments in each of the adjacent clusters
 wherein the plurality of clusters are distributed in two dimensions in the display area.

12. A head-mounted display device, comprising:
 a see-through element provided with a plurality of pixel elements configured to emit light for displaying an image, wherein the plurality of pixel elements are distributed across a display area of the see-through element in a manner to form a plurality of display segments, each of the plurality of display segments including a sub-plurality of the plurality of pixel elements,
 wherein a pixel distance between adjacent pixel elements belonging to adjacent display segments is larger than a pixel distance between adjacent pixel elements in each of the adjacent display segments,
 an optical system for reducing the divergence of a divergent light beam emitted by each of the plurality of display segments, the optical system including a plurality of optical elements each associated with a respective different segment group, each segment group including a sub-plurality of the plurality of display segments,
 wherein a light beam emitted by each display segment of a segment group is directed by the associated optical element at a position enabling reception of the light beam at a retina of an eye of a user wearing the head-mounted display device, control circuitry adapted to drive each display segment of a segment set to display a same image portion of an original image, the segment set including two or more display segments from the plurality of display segments, wherein each display segment of a segment set is included in a different segment group.

13. The display device of claim 12, wherein the plurality of segments groups are distributed in two dimensions in the display area.

14. The display device of claim 12, wherein the plurality of display segments are distributed across the display area of the see-through element in a manner to form a plurality of clusters, each of the plurality of clusters corresponding to a respective different segment group, wherein a pixel distance between adjacent pixel elements belonging to adjacent clusters is larger than a pixel distance between adjacent pixel elements belonging to adjacent display segments in each of the adjacent clusters.

* * * * *